United States Patent
Burchell et al.

(10) Patent No.: US 8,186,503 B1
(45) Date of Patent: May 29, 2012

(54) ADJUSTABLE CURVED FENCE ASSEMBLY

(75) Inventors: Victor Howard Burchell, Howell, MI (US); James Harper Moffitt, York, PA (US)

(73) Assignee: SEETECH Systems, Inc., York, PA (US)

( * ) Notice: Subject to any disclaimer, the term of this patent is extended or adjusted under 35 U.S.C. 154(b) by 0 days.

(21) Appl. No.: 13/004,061

(22) Filed: Jan. 11, 2011

Related U.S. Application Data

(60) Provisional application No. 61/385,663, filed on Sep. 23, 2010.

(51) Int. Cl.
*B65G 21/20* (2006.01)

(52) U.S. Cl. .................................... 198/836.3

(58) Field of Classification Search ............... 198/836.1, 198/836.3
See application file for complete search history.

(56) References Cited

U.S. PATENT DOCUMENTS

| | | |
|---|---|---|
| 3,581,877 A | 6/1971 | Goldberg |
| 4,930,621 A | 6/1990 | Brown et al. |
| 5,211,280 A | 5/1993 | Houde |
| 5,291,988 A | 3/1994 | Leonard |
| 6,050,396 A | 4/2000 | Moore |
| 6,059,096 A | 5/2000 | Gladieux |
| 6,305,528 B1 | 10/2001 | Leonard |
| 6,378,695 B1 | 4/2002 | Rinne |
| 6,454,084 B2 | 9/2002 | Csiki et al. |
| 6,827,203 B2 | 12/2004 | Andreoli et al. |
| 6,889,823 B2 | 5/2005 | Delaporte et al. |
| 7,431,150 B2 | 10/2008 | Ranger |
| 7,530,453 B2 * | 5/2009 | Ingraham ................... 198/836.3 |
| 7,735,636 B2 | 6/2010 | Lundberg |
| 7,748,523 B2 | 7/2010 | Robertson |
| 2003/0164280 A1 | 9/2003 | Delaporte et al. |
| 2007/0114112 A1 | 5/2007 | Guenther |

FOREIGN PATENT DOCUMENTS

JP 4-350012 * 12/1992

* cited by examiner

*Primary Examiner* — James R Bidwell

(74) *Attorney, Agent, or Firm* — Hooker & Habib, P.C.

(57) ABSTRACT

An adjustable curved fence assembly for a conveyor includes a curved guide fence and a number of pneumatic cylinders attached to the curved guide fence. The cylinder piston rods move between extended and retracted positions to change the radius of curvature of the curved guide fence.

20 Claims, 4 Drawing Sheets

ADJUSTABLE CURVED FENCE ASSEMBLY

FIELD OF THE INVENTION

The invention relates to conveyors for transporting articles along a conveyor path, and more specifically, to an adjustable curved fence assembly for a conveyor.

BACKGROUND OF THE INVENTION

Conveyors are used in the manufacture of plastic blow-molded bottles to transport the bottles ejected from a blow molding machine to cooling and processing stations. A bottle conveyor typically includes a conveyor belt or chain moving through straight conveyor sections joined by curved conveyor sections. Guide fences extend along both sides of the conveyor to stabilize the bottles and to ensure the proper orientation of the bottles during transportation and processing. The spacing between the fences is adjustable to enable the conveyor belt to convey different sized bottles of varying size and capacity.

Adjusting the spacing of a curved fence may be accomplished by rotating the fence around an axis of rotation. This changes the vertical position of the fence with respect to the conveyor belt. Other curved fences are adjusted by translating the curved fence along a linear axis towards and away the other curved fence. The inner and outer curved fences may not remain concentric with each other and so the radial spacing between the curved fences may vary along the circumferential length of the fences. Yet other curved fences are adjusted by radial movement of a number of arc segments. Such fences are mechanically complex, and it can be difficult to present a smooth guide surface to the bottles moving along the fence. And yet other curved guide fences rely on tensile forces being present across the cross-section of the fence along the length of the fence to elastically deform the fence. These curved fences are limited to use where only relatively small changes in radius (for example, one or two millimeters) are required.

Modern conveyors include a flexible conveyor chain that enables the chain to make relatively sharp, small radius turns between straight sections. Known adjustable curved fences do not offer the adjustment capabilities needed for relatively sharp conveyor turns. Furthermore, bottles are no longer simply round; bottles have become more complex in shape and often require an adjustable curved fence that does not change vertical height and can provide relatively constant radial spacing between the inner and outer curved fences throughout its adjustment range to assure proper orientation of the bottles as they move through the curve.

Thus there is a need for an improved adjustable curved fence assembly for use with modern flexible chain conveyors.

SUMMARY OF THE INVENTION

The present invention is an improved adjustable curved fence assembly that is well suited for use with flexible chain conveyors as well as other types of conveyors.

The improved curved fence assembly provides an adjustable, smoothly curving fence for a curved conveyor section that does not change vertical height and can provide relatively constant radial spacing between the inner and outer curved fences throughout its adjustment range. Adjustment of the curved fence can be made under automatic control and can be integrated with automatic control of the displacement of adjacent guide fences located at the entrance or exit of the curved conveyor section.

A conveyor incorporating the adjustable curved fence assembly of the present invention includes a curved conveyor section, a curved guide fence, and a number of actuators. The curved conveyor section defines an arcuate portion of a conveyor path. The curved guide fence extends along one side of the curved conveyor section path. Each actuator is actuatable for straight-line movement along an axis and is actuatable between extended and retracted positions along the axis.

Each actuator is fastened to a respective attachment portion of the curved guide fence for conjoint straight line movement of the attachment portion of the curved guide fence with the actuator. The curved guide fence has a substantially constant first radius of curvature when the actuators are in the extended position and a second, different, substantially constant radius of curvature when the actuators are in the retracted position.

In preferred embodiments of the invention the curved guide fence includes a rolled spring steel plate that acts dynamically as a flexible beam or spline that has the radial flexibility to assume a smooth, curved shape and yet has adequate strength to function as a guide fence.

The actuators axes are preferably parallel with one another and parallel with an angular centerline of the curved conveyor section. This assists in displacing the ends of the curved guide fence with minimum application of force.

An end of the curved guide fence can be connected to a side fence adjacent the curved conveyor path. The side fence can be displaced between extended and retracted positions. The end of the curved guide fence can be attached to the side fence and move with the side fence.

Actuation of the actuators to change the curvature of the curved guide fence and the displacement of the side fence can be under the automatic control of a control system. The control system can introduce a time delay between displacement of the side fence and actuation of the actuators to reduce the forces acting on the actuators when moving the curved guide fence.

In yet other embodiments the end of the curved guide fence can slide with respect to the side fence to compensate for changes in circumferential length of the curved guide fence while maintaining a constant exit angle into or out of the curved conveyor section.

Other objects and features of the invention will become apparent as the description proceeds, especially when taken in conjunction with the accompanying four drawing sheets illustrating an embodiment of the invention.

DESCRIPTION OF THE PREFERRED EMBODIMENT

Figure 1:
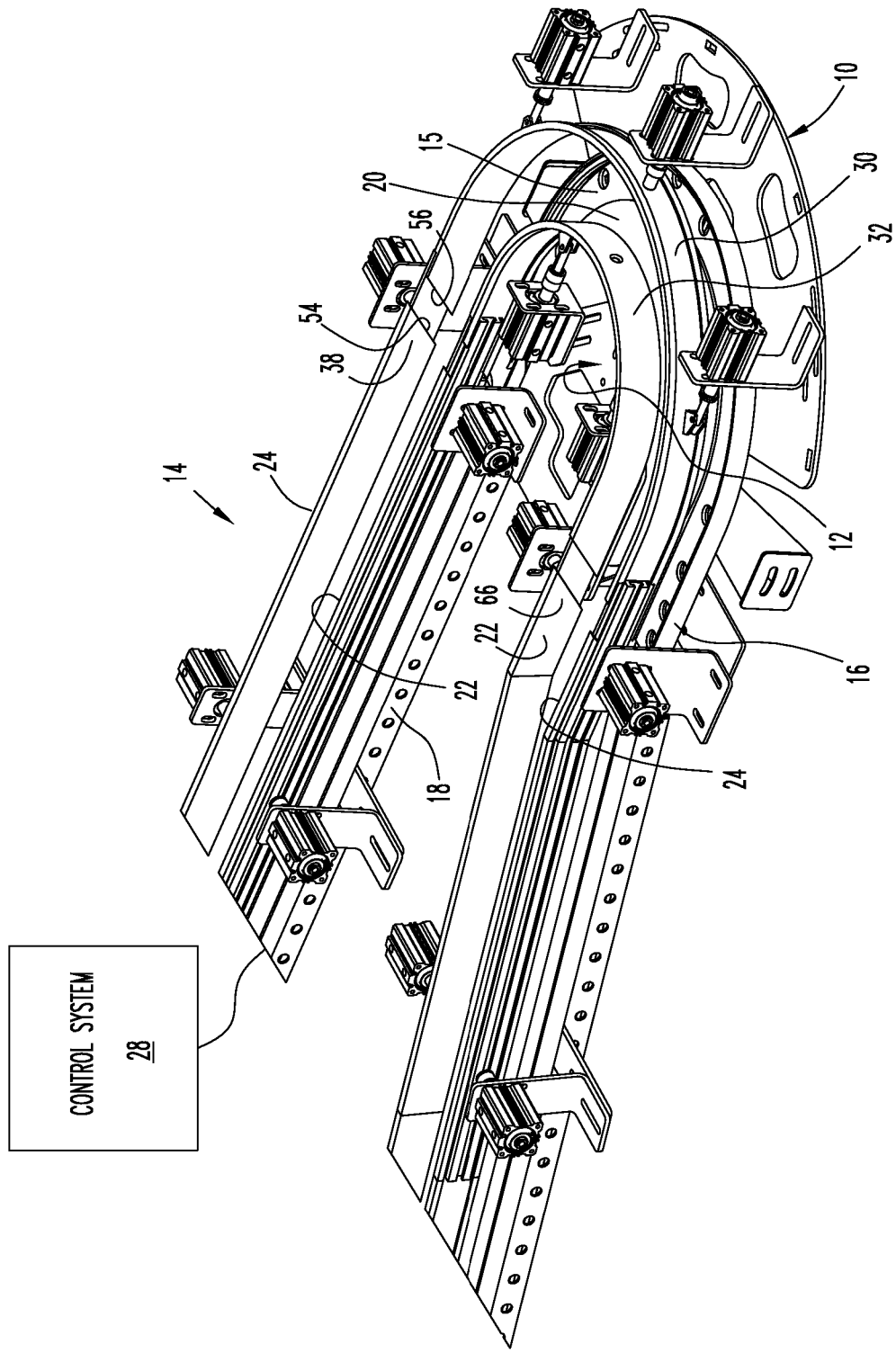
FIG. 1 is a perspective view of a curved portion of a flexible chain conveyor that incorporates the adjustable fence apparatus in accordance with the present invention.
Figure 2:
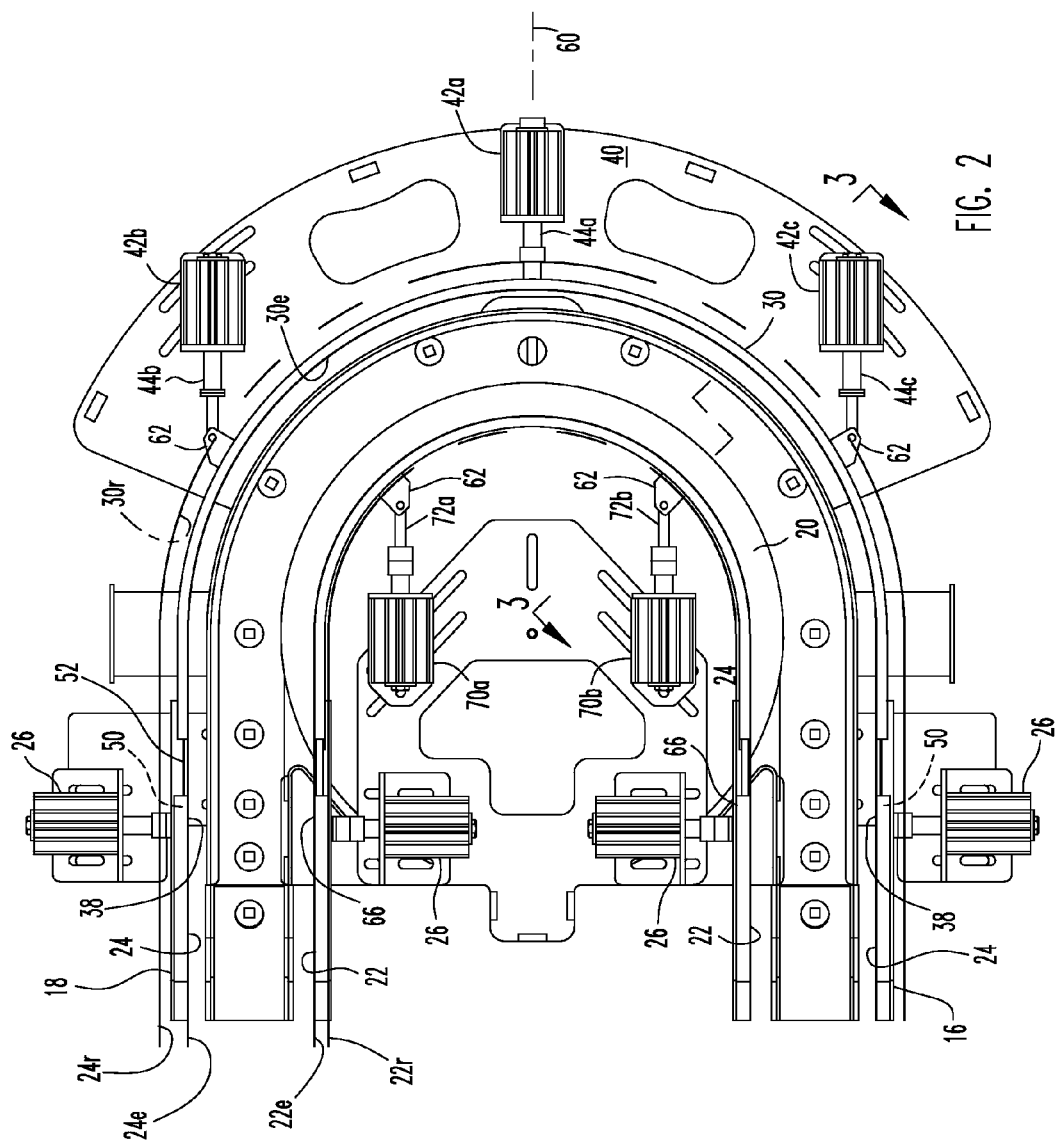
FIG. 2 is a top view of the curved conveyor portion shown in FIG. 1.
Figure 3:
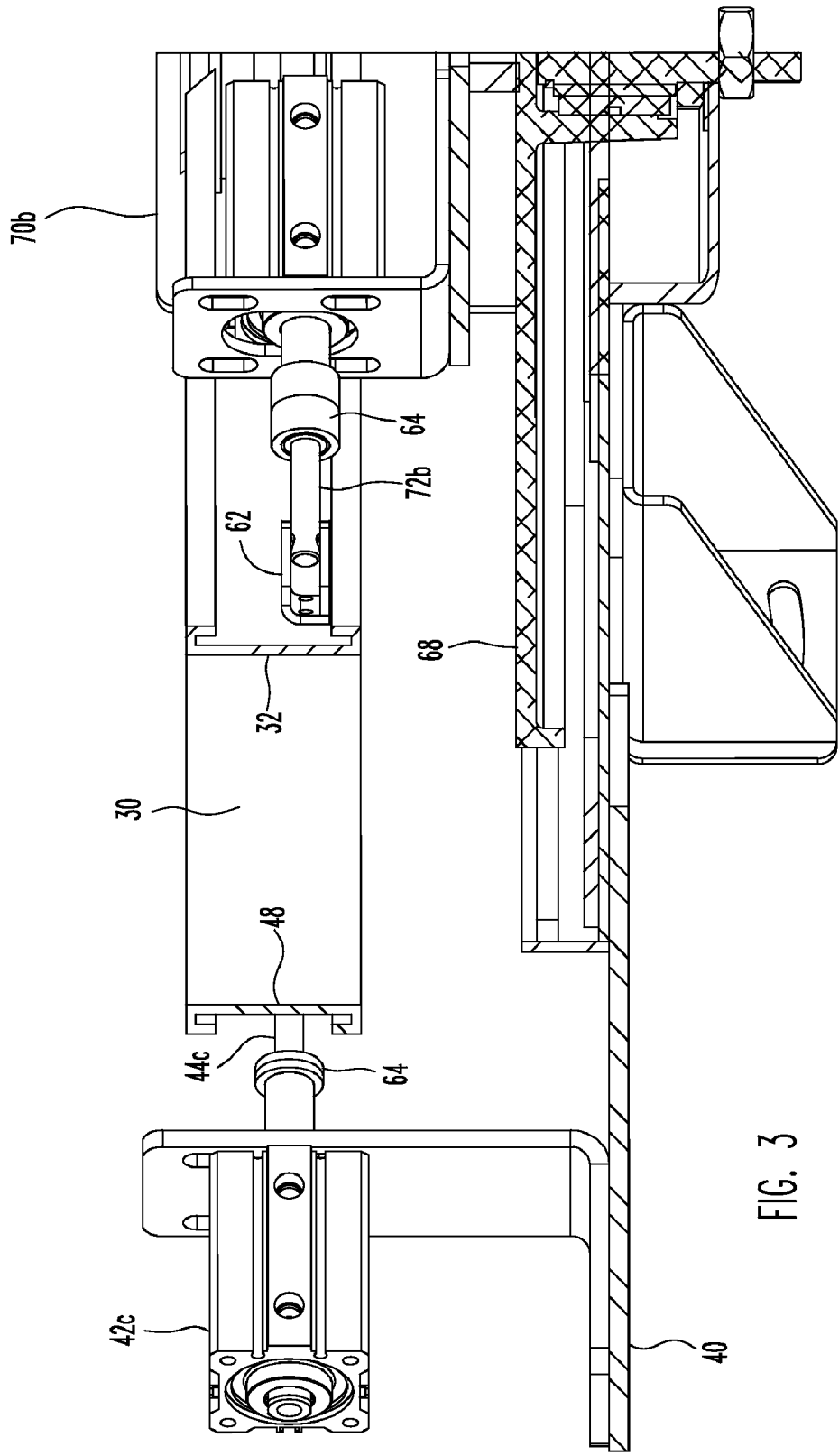
FIG. 3 is a sectional view taken along line 3-3 of FIG. 2.

FIGS. 1-3 illustrate an adjustable curved fence apparatus 10 and an adjustable curved fence apparatus 12, each apparatus 10, 12 in accordance with the present invention, attached to an otherwise conventional flexible chain conveyor 14. The illustrated conveyor 14 conveys blow-molded plastic bottles received from a blow molding machine (not shown) and includes a flexible conveyor chain 15 that travels along a pair of parallel straight conveyor sections 16, 18 joined by a horizontal 180-degree wheel bend 20.

Bottles are guided along the straight conveyor sections 16, in a conventional manner by pairs of inner and outer side fences 22, 24 located on opposite sides of each conveyor straight section 16, 18. Each side fence 22, 24 is connected to a respective set of pneumatic cylinders 26 that translate the side fence 22 or 24 in a direction perpendicular to the side fence between extended and retracted positions of the fence. The pneumatic cylinders are connected to a control system 28 that enables an operator to selectively control the positions of the fences 22, 24.

The adjustable curved fence apparatus 10 includes a curved fence 30 that extends along the radially outer side of the wheel bend 20. The adjustable curved fence apparatus 12 includes a curved fence 32 that extends along the radially inner side of the wheel bend 20. The outer curved fence 30 cooperates with the outer side fences 24 to guide bottles along one side of the conveyor and the inner curved fence 32 cooperates with the inner side fences 22 to guide bottles along the other side of the conveyor. Each curved fence apparatus 10, 12 is operatively connected to the control system 28 to automatically adjust the radius of curvature of the curved fences 30, 32 in response to changes in operating position of the side fences 22, 24 as will be described in further detail below.

The side fences 22, 24 and the curved fences 30, 32 are positionable to guide three different widths or sizes of bottle: a small bottle, in which the side fences 22, 24 are both in an extended position and are closest to one another; a large bottle, in which the side fences 22, 24 are each in a retracted position and are the farthest apart from one another; and a medium bottle, in which the inner side fence 22 is in the retracted position and the outer side fence 24 is in the extended position.

FIG. 2 illustrates the conveyor 14 in its small-bottle configuration and conveying small bottles. The side fences 22, 24 are in their extended positions shown by respective lines 22e, 24e. When the conveyor 14 is in its medium-bottle configuration and conveys medium bottles, the inner side fences 22 remain in their extended positions represented by the lines 22e and the outer side fences 24 are moved to their retracted positions represented by the lines 24r. When the conveyor 14 is in its large-bottle configuration and conveys large bottles, the inner side fences 22 are moved to their retracted positions represented by the lines 22r, and the outer side fences 24 are in their retracted positions represented by the lines 24r.

The illustrated conveyor 14 has the inner and outer side fences 22, 24 extending along a straight conveyor section separated by a distance of 4.5 inches, 5 inches, and 6 inches when the conveyor 14 is in its small-bottle, medium-bottle, and large-bottle configurations respectively.

The curved fence apparatus 10, 12 each moves the respective curved fence 30, 32 to accommodate the different bottle sizes so that the fences 30, 32 remain essentially semicircular in shape and concentric with one another. The radial distance between the fences 30, 32 is essentially constant around the wheel bend 20 and is equal to the distance between the inner and outer side fences 22, 24 for all three configurations of the conveyor 14.

When the conveyor 14 is in its small-bottle configuration as shown in FIG. 2, the outer curved fence 30 has a minimum radius of curvature represented by the line 30e and the inner curved fence 32 has a maximum radius of curvature represented by the line 32e. This represents the extended position of the outer curved fence 30 and the extended position of the inner curved fence 32. When the conveyor 14 is in its medium-bottle configuration, the inner curved fence 32 moves to its minimum radius of curvature position as represented by the curved phantom line 32r. This represents the retracted position of the inner curved fence 32. When the conveyor 14 is in its large-bottle configuration, the outer curved fence 30 moves to its maximum radius of curvature position as represented by the curved phantom line 30r. This represents the retracted position of the outer curved fence 30. The inner curved fence 32 is also in its retracted position.

In the illustrated embodiment, the maximum radius of curvature and the minimum radius of curvature of the outer curved fence 30 is thirteen-and-one-quarter inches (13¼ ") and twelve-and-one-quarter inches (12¼") respectively. The maximum radius of curvature and the minimum radius of curvature of the inner curved fence 32 is seven-and-three-quarters inches (7¾") and seven-and-one-quarter inches (7¼") respectively.

The adjustable curved fence apparatus 10 additionally includes a pair of fence sleeves 38, a base or platform 40 attached to the bottom of the wheel bend 20 that extends away from the outside of the wheel bend 20, and a number of actuators 42 attached to the base 40 and located on the convex side of the curved fence 30. The actuators 42 are attached to the fence 30 and assist in controlling the curvature of the fence 30. The illustrated actuators 42 are pneumatic cylinders, each similar to a pneumatic cylinder 26. The free end of the piston rod 44 of each pneumatic cylinder 42 is fixedly attached to the convex outer surface of the fence 30.

Figure 4:
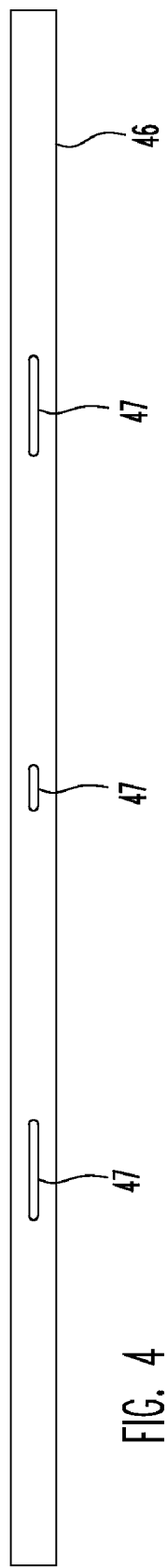
FIG. 4 is a front view of a first spring steel plate used to form part of the outer curved fence of the conveyor.
Figure 5:
FIG. 5 is a front view of a second spring steel plate used to form part of the inner curved fence of the conveyor.

The fence 30 is made primarily from spring steel and formed from a sheet metal or flat plate 46 (see FIG. 4). The illustrated plate 46 has a height dimension of 1.5 inches and a thickness of 0.052 inches. The spring steel provides the fence 30 with sufficient rigidity to smoothly guide bottles along the curve and yet enables the fence 30 to be mechanically displaced between radii of curvature. The plate 46 is rolled to have a slightly smaller radius in its rest or relaxed condition than the largest operating radius of the fence 30. A set of elongate slots 47 extend through the thickness of the plate 46 for connecting the fence 30 to the pneumatic cylinders 42. The plate material removed by the slots 47 should be kept to a minimum so as not to compromise the structural integrity of the steel plate for rolling or for changing the radius of curvature of the fence 30. The spring steel 46 is sleeved or coated with UHMW plastic 48 that creates a smooth, relatively low friction bottle guiding surface along the fence.

Application of the plastic coating 48 tends to increase the radius of the resulting fence 30; the steel plate 46 is initially rolled to an undersized radius so that when coated with plastic, the fence 30 has a static or relaxed radius of curvature essentially equal to the largest radius of curvature needed for the conveyor 14 (that is, the curvature of the outer curved fence 30 when in its static, relaxed condition is essentially equal to the curvature 30r shown in FIG. 2).

The fence sleeves 38 form the ends of the outer side fences immediately adjacent the wheel bend 20 to assist in the transition to and from the curved fence 30. Each fence sleeve 38 has the same height as the fence 30 and is similarly coated with UMHW plastic. Each sleeve 38 defines an axial pocket or slot 50 that closely receives an end portion 52 of the fence 30 but allows relative linear movement of the fence 30 into and out of the sleeve slots to compensate for changes in fence radius.

The fence sleeve 38 has a mitered or sloping end 54 that extends at an obtuse angle with respect to the horizontal plane of the conveyor. The fence end portions 52 are not coated with UMDW plastic. The ends 56 of the fence plastic 48 extend along the same slope as the sleeve end 54. This angle is about 45 degrees and is chosen to enable some vertical overlap of the plastic on the fence sleeve 38 with the plastic 48 on the fence 30 for all operating radii of the curved fence 30. The adjacent angled ends of the plastic on the fence 30 and the fence sleeve define an angled plastic miter joint that assures that a bottle transitioning between a straight conveyor section and the curved conveyor section will always bear against the fence plastic even if the ends of the fences 30 extend a distance out of the sleeves 38.

The pneumatic cylinders 42 are fixedly mounted to the platform 40 and include a first cylinder 42*a* whose piston rod 44*a* extends along the 90-degree centerline 60 of the wheel bend 20 and offset cylinders 42*b*, 42*c* on opposite sides of the cylinder 42*a*. The piston rods 44*b*, 44*c* of the pneumatic cylinders 42*b*, 42*c* are each substantially parallel with the centerline 60. The piston rods 42 are spaced above the platform 40 so as to be even with the horizontal midline of the fence 30.

The piston rod 44*a* of the center pneumatic cylinder 42*a* is essentially perpendicular to the fence 30 for all operating positions of the fence. The piston rod 44*a* is fixedly attached to the fence 30 by a countersunk screw (not shown) passing through the fence 30 and into the rod 44*a*. The piston rods 44*b*, 44*c* are not perpendicular to the fence 30 where each contact the fence 30. Each piston rod 44*b*, 44*c* is attached to the fence 30 by a wedge clip 62 fixed to the end of the piston rod. The wedge clip 62 has a bearing surface that is oriented substantially tangential with the fence 30 and overlays a respective fence slot 47. Radially-aligned countersunk screws (not shown) pass through the fence slot 47 and into the wedge clip 62 to fixedly attach the wedge clip 62 to the fence 30.

Each piston rod 44 is independently driven along a linear piston stroke that is parallel with the centerline 60 between extended and retracted positions. The piston rods 44 are in retracted positions when the outer curved fence 30 is at its maximum radius of curvature and in extended positions when the outer curved fence 30 is at its minimum radius of curvature. Optional stop members 64 attached to the piston rod 44 establish the end limits of a piston stroke. The piston rods 44 push on the curved fence 30 when moving the curved fence 30 from its retracted, maximum radius of curvature position to its extended, minimum radius of curvature position. The piston rods 44 pull on the curved fence 30 when moving the curved fence 30 from its extended, minimum radius of curvature position to its retracted, maximum radius of curvature position.

The adjustable curved fence apparatus 12 is similar to the curved fence apparatus 10 but is configured to selectively adjust the radius of curvature of the inner curved fence 32. The curved fence 32 is similar in construction to the curved fence 30 and incorporates a sheet metal or rolled spring steel plate 65 (see FIG. 4). The steel plate 65 is sized and rolled so that in its relaxed state the inner fence 32 when ready for installation has a static or relaxed radius of curvature essentially equal to the largest radius of curvature needed for the conveyor 14 (that is, the curvature of the fence 32 when in its static or relaxed condition is essentially equal to the curvature 32*e* shown in FIG. 2).

The apparatus 12 includes a pair of fence sleeves 66 similar to the fence sleeves 38 but forming the ends of the side fences 22, a base or platform 68 that extends away from the inside of the wheel bend 20, and a pair of pneumatic cylinders 70 like the pneumatic cylinders 42 mounted on the base 68 and on the concave side of the curved fence 32. The illustrated pneumatic cylinders 70*a*, 70*b* are mounted on opposite sides of the bend centerline 60. The piston rods 72*a*, 72*b* of the cylinders 70*a*, 70*b* are essentially parallel with the centerline 60 and are attached to the inner fence 32 by wedge clips 62 in the same manner as described for the piston rods 44. Optional stop members 64 attached to each of the piston rods 72 establish the end limits of the piston rod's stroke.

The piston rods 72 are in retracted positions when the inner curved fence 32 is at its minimum radius of curvature and in extended positions when the inner curved fence 32 is at is minimum radius of curvature. The piston rods 72 push on the curved fence 32 when moving the curved fence 30 from its retracted, minimum radius of curvature position to its extended, maximum radius of curvature position. The piston rods 72 pull on the curved fence 32 when moving the curved fence 32 from its extended, maximum radius of curvature position to its retracted, minimum radius of curvature position.

Operation of the adjustable curved fence apparatus 10 and 12 when changing conveyor configuration is described next. The outer curved fence 30 is in its relaxed position when it is in its retracted, maximum radius of curvature position because it is nearest its static rest shape. The outer curved fence 30 is in its displaced position in its extended, minimum radius of curve position, because it has been mechanically displaced away from its relaxed position. The inner curved fence 32 is in its relaxed position when in its extended, maximum radius curvature position, because it is nearest its static rest shape. The inner curved fence 32 is in its displaced position in its retracted, minimum radius of curvature position, because it has been mechanically displaced away from its relaxed position.

Changes in conveyor configuration require actuating some or all of the pneumatic cylinders 26 to extend or retract one or both sets of the side fences 22, 24, and actuating the pneumatic cylinders 42, 70 of one or both curved fence apparatus 10, 12 to achieve the desired semicircular shape of the curved fence or curved fences. It is preferred to actuate the pneumatic cylinders attached to a curved fence first before actuating the pneumatic cylinders attached to the side rails connected to that curved fence when moving the curved fence from its relaxed position to its displaced position. It is preferred to actuate the pneumatic cylinders attached to the side rails first before actuating the pneumatic cylinders attached to the curved fence connected to those side rails when moving the curved fence from its displaced position to its relaxed position. It is believed this preferred sequence of operation minimizes the forces acting on all the piston rods 44, 72 when displacing a fence 30, 32.

Changing the conveyor 14 from its smallest-bottle configuration to its medium-bottle configuration will be described first.

In the initial small-bottle configuration, the side fences 22, 24 and the inner and outer curved fences 30, 32 are each in their extended positions. It is desired to move the inner side fences 22 to their retracted positions and to move the inner fence 32 from its extended, relaxed position to its retracted, displaced position. Because the inner fence 32 is moving from its relaxed position to its displaced position, the control system 28 actuates the set of pneumatic cylinders 70 attached to the inner curved fence 32 first to retract the piston rods 72 and pull the fence 32 towards its displaced position. The pneumatic cylinders 26 attached to the inner side fences 22 are then actuated to move the inner fences 22 to their retracted positions.

The fence 32 acts dynamically as a flexible beam or flexible spline having control positions at the attachment points of the fence 32 to the piston rods 72 and the end angles of the spline controlled by the fence sleeves 38 so that the fence 32 forms an essentially semicircular fence having a continuously smooth conveyor guide surface extending around the inner periphery of the wheel bend 20. The piston rods 72a, 72b act arranged parallel to the centerline 60 rather than being arranged radially with respect to the wheel bend 20 to better "wrap" or "unwrap" the end portions of the fence 32 with less force when moving the fence between extended and retracted positions. The wedge clips help reduce off-axis forces applied to the piston rods 72 during movement of the rods. The inner fence 32 when in the displaced position is in a stressed state and the piston rods 72 when stationary in their retracted positions assist the fence sleeves 38 in maintaining the fence 32 in its desired semicircular shape.

Changing the bottle conveyor 14 from its medium-bottle configuration to its smallest-bottle configuration is done in reverse order, that is, the pneumatic cylinders 26 are actuated first to move the side rails 22 to their extended positions and the pneumatic cylinders 70 are then actuated to push the curved fence 32 toward its relaxed position.

Changing the bottle conveyor 14 from its largest-bottle configuration to its medium-bottle configuration will be described next.

In the initial large-bottle configuration, the side fences 22, 24 and the inner and outer curved fences 30, 32 are each in their retracted positions. It is desired to move the outer side fences 22 to their extended positions and to move the outer fence from its extended, relaxed position to its retracted, displaced position. Because the outer fence 30 is moving from its relaxed position to its displaced position, the control system 28 actuates the set of pneumatic cylinders 42 attached to the outer curved fence 30 first to extend the piston rods 42 and push the fence 30 towards its displaced position. The pneumatic cylinders 26 attached to the outer side fences 24 are then actuated to move the inner fences 24 to their extended positions.

The fence 30 also acts dynamically as a flexible beam or flexible spline having control positions at the attachment points of the fence 30 to the piston rods 42 and the end angles of the spline controlled by the fence sleeves 38 so that the fence 30 forms an essentially semicircular fence having a continuously smooth conveyor guide surface extending around the outer periphery of the wheel bend 20. The fence 30 when in its displaced position is in a stressed state and the piston rods 44 assist the fence sleeves 38 in holding the fence 30 in its desired semicircular shape. Aligning the piston rods 44 parallel with the wheel bend centerline 60 offers the same advantages as previously described for the piston rods 72.

Changing the bottle conveyor 14 from its medium-bottle configuration to its largest-bottle configuration is done in reverse order, that is, the pneumatic cylinders 26 are actuated first to move the side rails 24 to their retracted positions and the pneumatic cylinders 42 are then actuated to pull the curved fence 30 toward its relaxed position.

Changing the bottle conveyor 14 from its largest-bottle configuration to its smallest-bottle configuration is described next.

In the initial large-bottle configuration, the side fences 22, 24 and the inner and outer curved fences 30, 32 are each in their retracted positions. It is desired to move the inner and outer side fences 22, 24 to their extended positions and to move the curved fences 30, 32 to their extended positions. With respect to the outer fence 30, the outer fence 30 is moving from its relaxed position to its displaced position. The control system 28 actuates the set of pneumatic cylinders 40 attached to the outer curved fence 30 first to extend the piston rods 44 and push the fence 30 towards its displaced position. The pneumatic cylinders 26 attached to the outer side fences 24 are then actuated to move the outer fences 24 to their extended positions. With respect to the inner fence 32, the inner fence 30 is moving from its displaced position to its relaxed position. The control system 28 actuates the set of pneumatic cylinders 26 attached to the inner side fences 22 to move the inner fences 22 to their extended positions. The set of pneumatic cylinders 70 attached to the inner fence 32 are then actuated to move the inner fence 32 to its extended position.

Changing the bottle conveyor 14 from its small-bottle configuration to its large-bottle configuration is done in reverse order, that is, with respect to the outer curved fence 30 the pneumatic cylinders 26 are actuated first to move the side rails 24 to their retracted positions and the pneumatic cylinders are then actuated to pull the curved fence 30 toward its relaxed position. With respect to the inner curved fence 32, the pneumatic cylinders 70 are actuated to pull the curved fence 32 toward its displaced position and the pneumatic cylinders 26 are then actuated to move the side rails 22 to their retracted positions.

The illustrated wheel bend 20 is a 180-degree wheel bend. The adjustable fence assembly of the present invention can be used with other wheel bends, including 22½-degree, 45-degree, 90-degree, 135-degree, and the like wheel bends, or with vertical wheel bends. The adjustable fence assembly of the present invention can also be used with other types of conveyors, including without limitation belt conveyors, roller conveyors, and the like, and can be used in conveying other types of articles. The number and spacing of the actuators can vary from that shown in the illustrated embodiment to accommodate larger or smaller radius turns. Actuators can also be vertically stacked if attached to higher fences.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

We claim:

1. A conveyor for conveying articles along a conveyor path, the conveyor comprising:
    a curved conveyor section, a curved guide fence, and a plurality of actuators, said plurality of actuators comprising at least a first actuator and a second actuator;
    the curved conveyor section defining an arcuate portion of the conveyor path;
    the curved guide fence being an integral, continuous member extending along one side of the curved conveyor section and comprising a surface facing and extending along the curved conveyor section, the surface bounding a side of the conveyor path;
    each of the said plurality of actuators actuatable for straight-line movement along an axis and actuatable between extended and retracted positions along the axis;
    each of the said plurality of actuators rigidly fastened to a respective attachment portion of the curved guide fence for conjoint movement of the attachment portion of the curved guide fence with the actuator;
    the curved guide fence having a substantially constant first radius of curvature when the actuators are in the extended position and a second, different, substantially constant radius of curvature when the actuators are in the retracted position.

2. The conveyor of claim 1 wherein the said plurality of actuators comprise at least one actuator whose movement axis is not perpendicular with the curved guide fence.

3. The conveyor of claim 2 wherein the axes of said plurality of actuators are parallel with one another.

4. The conveyor of claim 2 wherein the said at least one actuator comprises a bearing surface that bears against the curved fence, the bearing surface disposed substantially tangent to the curved guide fence.

5. The conveyor of claim 1 wherein the plurality of actuators push the curved guide fence when moving in a first direction between extended and retracted positions and pull the curved guide fence when moving in a second, opposite direction between extended and retracted positions.

6. The conveyor of claim 1 wherein a convex side of the curved guide fence faces the plurality of actuators, the curved guide fence extending along a radially outer side of the arcuate portion of the conveyor path.

7. The conveyor of claim 1 wherein a concave side of the curved guide fence faces the plurality of actuators, the curved guide fence extending along a radially inner side of the arcuate portion of the conveyor path.

8. The conveyor of claim 1 wherein the curved guide fence comprises spring steel.

9. The conveyor of claim 8 wherein the spring steel is a rolled metal plate.

10. The conveyor of claim 1 wherein the curved conveyor section represents a first conveyor section and the conveyor comprises a second conveyor section defining a second portion of the conveyor path, the second portion and the curved portion of the conveyor path contiguous with one another;

the second conveyor section comprises a second guide fence extending along one side of the second conveyor path portion, the second guide fence displaceable between spaced-apart extended and retracted positions; and an end portion of the curved guide fence is attached to the second guide fence for conjoint displacement with the second guide fence.

11. The conveyor of claim 10 wherein the end portion of the curved guide fence maintains a constant angular alignment with respect to the second guide fence for all positions of the second guide fence.

12. The conveyor of claim 11 wherein the second guide fence is movable along a second axis between extended and retracted positions, and the end portion of the curved guide fence is relatively moveable with respect to the second guide fence in a direction transverse to the second axis.

13. The conveyor of claim 12 wherein the end portion of the curved guide fence bears against the second guide fence and is relatively slideable along the second guide fence.

14. The conveyor of claim 13 wherein the end portion of the curved guide fence is slideably received in a slot formed in the second guide fence.

15. The conveyor of claim 10 comprising a control system operationally connected to the plurality of actuators and to the second guide fence to control actuation of the plurality of actuators and to control displacement of the second guide fence, the control system configured to insert a time delay between actuation of the plurality of actuators and an initial displacement of the second guide fence.

16. The conveyor of claim 15 wherein the curved guide fence is in a more relaxed position when at its first radius of curvature and is in a more stressed position when at its second radius of curvature; and the control system is configured to actuate the plurality of actuators before displacing the second guide fence when the curved guide fence is moved from its more relaxed position to its more stressed position and the control system is configured to displace the second guide fence before actuating the plurality of actuators when the curved guide fence is moved from its more stressed position to its more relaxed position.

17. The conveyor of claim 1 wherein the curved conveyor section includes a wheel bend.

18. The conveyor of claim 1 wherein the wheel bend is a 180-degree wheel bend.

19. The conveyor of claim 1 wherein the plurality of actuators are mounted on a plate that is stationary with respect to the conveyor path.

20. The conveyor of claim 1 wherein each actuator of the plurality of actuators comprises a pneumatic or hydraulic cylinder and a piston rod extending along the actuator axis.

* * * * *